No. 713,993. Patented Nov. 18, 1902.
A. B. KLAY.
BRICK DRYING KILN.
(Application filed Mar. 12, 1902.)
(No Model.) 2 Sheets—Sheet 1.

Witnesses:
Robert Everett
Dennis Sumby

Inventor:
Abraham B. Klay
By James L. Norris
Atty.

No. 713,993. Patented Nov. 18, 1902.
A. B. KLAY.
BRICK DRYING KILN.
(Application filed Mar. 12, 1902.)
(No Model.) 2 Sheets—Sheet 2.
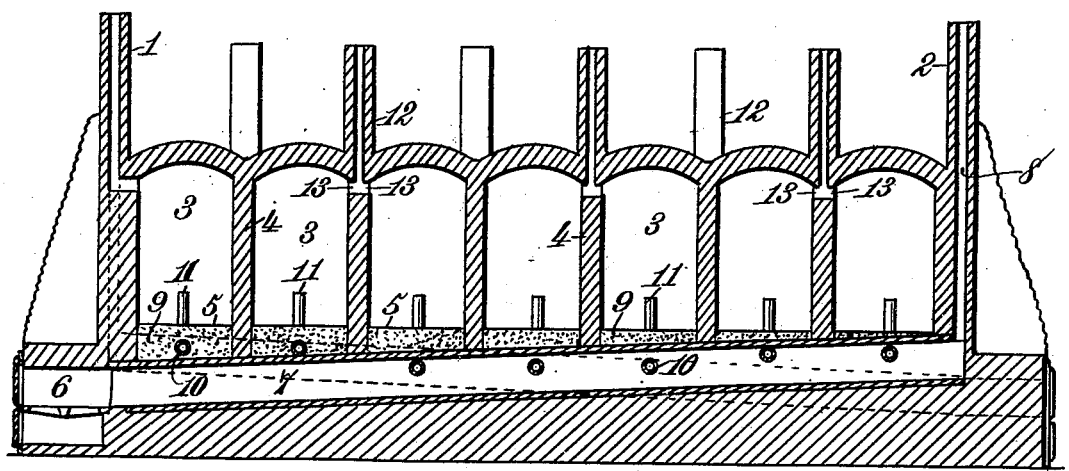
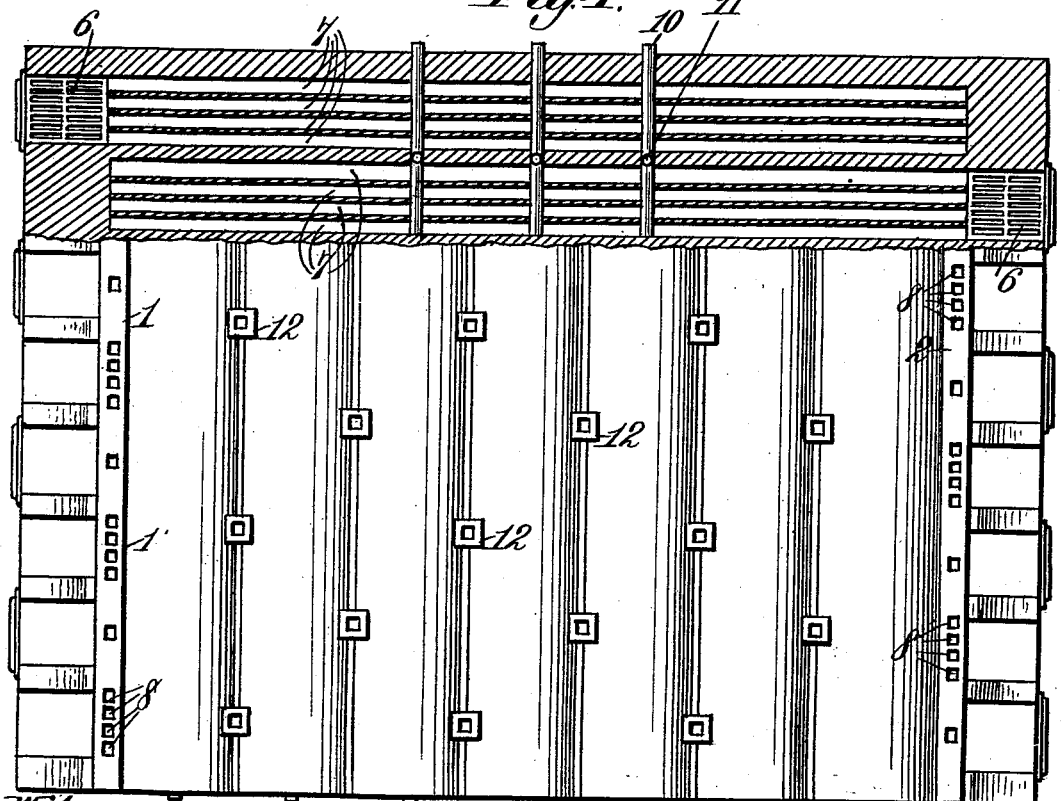
Witnesses. Inventor.
Robert Everett, Abraham B. Klay,
Dennis Sumby. By James L. Norris,
Att'y.

UNITED STATES PATENT OFFICE.

ABRAHAM B. KLAY, OF LIMA, OHIO, ASSIGNOR TO THE A. B. KLAY COMPANY, OF LIMA, OHIO, A CORPORATION OF WEST VIRGINIA.

BRICK-DRYING KILN.

SPECIFICATION forming part of Letters Patent No. 713,993, dated November 18, 1902.

Application filed March 12, 1902. Serial No. 97,915. (No model.)

*To all whom it may concern:*

Be it known that I, ABRAHAM B. KLAY, a citizen of the United States, residing at Lima, in the county of Allen and State of Ohio, have invented new and useful Improvements in Kilns for Drying Roofing-Tiles, Bricks, and Similar Articles, of which the following is a specification.

My invention relates to certain new and useful improvements in kilns for drying roofing-tiles, bricks, and similar articles, and has for its object to provide a novel construction and arrangement of parts whereby the heat will be evenly distributed throughout the chambers of the kiln and the bricks, tiles, or other articles therein uniformly and rapidly dried.

In order that my invention may be fully understood, I have illustrated the same in the accompanying drawings, wherein—

Figure 1:
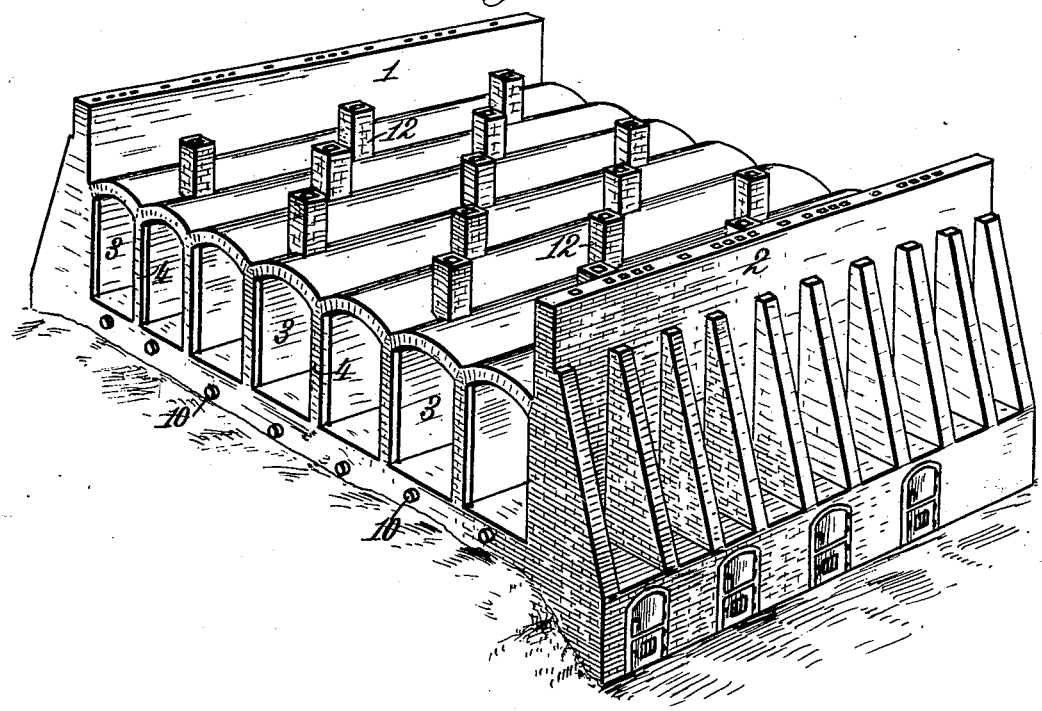
Figure 2:
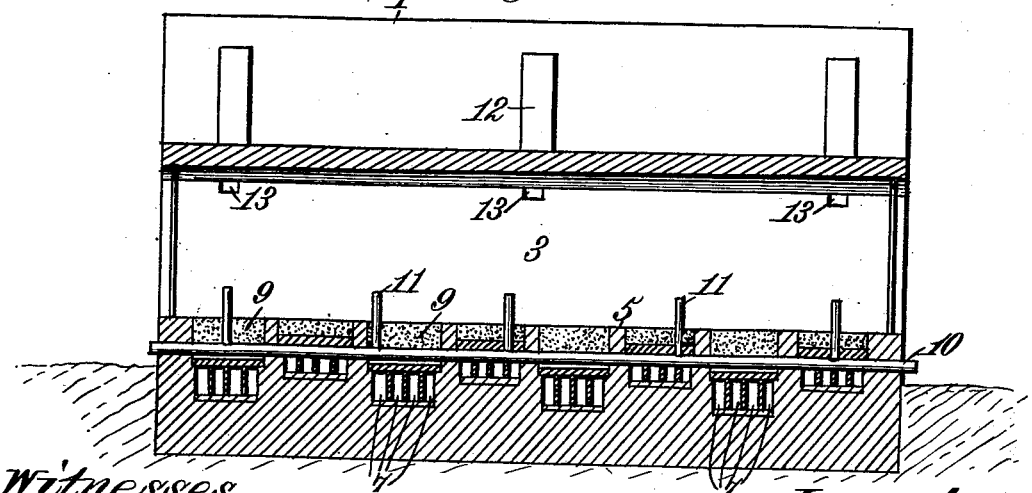

Figure 1 is a view in perspective of my improved drying-kiln. Fig. 2 is a vertical section taken through one of the drying-chambers. Fig. 3 is a vertical longitudinal section taken through one of the horizontal flues, and Fig. 4 is a sectional plan view.

Referring now to the drawings, 1 and 2 indicate, respectively, the two end walls of the kiln; 3, a series of drying-chambers having division-walls 4 extending parallel with the end walls 1 2 and a bottom or floor 5. The bottom or floor 5 is of course common to all of the drying-chambers. On the outer side of each end wall 1 2 a number of fire-boxes or furnaces 6 are arranged at equal distances apart, four being shown in the drawings. From each of these furnaces a number of flues 7 extend beneath the floor 5 to the opposite end wall, where escape-flues 8 are provided, a separate escape-flue 8 being provided for each flue 7. The flues 7 have a rise of about two inches in every ten feet to provide for the proper passage through the flues of the products of combustion. By preference four flues 7 are provided for each furnace, these flues extending side by side throughout the entire length of the kiln, but the various series of flues being alternately inclined in opposite directions, as shown more clearly in Figs. 2 and 3. The furnaces at each end alternate with the outlets 8—that is, between two adjacent furnaces there will be a series of four outlets 8 in the end walls 1 and 2. Under this construction there will be four series of four flues each or sixteen flues in all extending from the furnaces at the end 1 of the kiln to the opposite end 2 and inclined in one direction, while a like number of flues alternating in series of four with the first named will extend from the furnaces at the end 2 of the kiln to the end 1 and be inclined in the opposite direction. This insures an even distribution of heat beneath the entire floor-space of the kiln, and one end of the kiln cannot become more highly heated than the other.

In order to more thoroughly equalize the heat, I place a bed or layer of sand 9 on top of each flue 7.

To provide for admitting heated air into the drying-chambers in order to more rapidly dry the bricks or other articles and expel moisture, I arrange beneath each drying-chamber a pipe 10, open at each end and extending from one side of the kiln to the other at right angles to the flues 7, through which it passes, and connect to each pipe a number of vertical extensions 11, which pass upward through the floor of each drying-chamber. Five or more of these extensions may be provided for each drying-chamber, according to the length of said chambers. The air entering the pipes 10 will be heated by the flues 7 and discharged directly into the drying-chambers. The first few pipes 10 at each end of the furnace will be located higher than the others and suitably protected from the extreme heat of the adjacent furnace.

In order to provide for the free escape of moisture from the drying-chambers, I provide on each partition-wall 4 separating the chambers a number of chimneys 12, having on opposite sides, respectively, openings 13, communicating with adjacent drying-chambers near the tops thereof. These chimneys are preferably arranged in staggered relation to each other. Thus if, as shown, four chimneys be provided on one partition-wall and three on the next, and so on, each drying-chamber will have seven outlets for the escape of moisture. I also provide moisture-outlets 13 in the end walls 1 2, which communicate with the drying-chambers located adjacent to said end walls.

Having thus fully described my invention, what I claim as new is—

1. In a drying-kiln, a series of drying-chambers, a series of furnaces located at each end of said kiln, and a series of flues communicating with each of said furnaces and extending beneath said chambers from end to end of the kiln.

2. In a drying-kiln, a series of drying-chambers, a series of furnaces located at each end of said kiln, and a series of inclined flues communicating with each of said furnaces and extending beneath said chambers from end to end of the kiln.

3. In a drying-kiln, in combination with a series of drying-chambers, a series of furnaces located at each end of said kiln, and a series of flues communicating with each of said furnaces and extending beneath said chambers, from end to end of the kiln, said series of flues being alternately inclined in opposite directions.

4. In a drying-kiln, in combination with a series of drying-chambers, a series of furnaces located at each end of said kiln, and a series of inclined flues communicating with each of said furnaces and extending beneath said chambers and having outlets in the opposite end walls of the kiln.

5. In a drying-kiln, in combination with a series of drying-chambers, a series of furnaces located at each end of said kiln, and a series of flues communicating with each of said furnaces and extending beneath said chambers said series of flues being alternately inclined in opposite directions and each of said flues having a separate outlet in the opposite end wall of the kiln.

6. In a drying-kiln, a series of drying-chambers separated by means of partition-walls, a series of furnaces located at each end of said kiln, a series of inclined flues communicating with each of said furnaces and extending beneath said chambers, and a series of chimneys on each partition-wall for the escape of moisture each of said chimneys communicating by means of openings, or ducts, with adjacent chambers.

7. In a drying-kiln, a series of drying-chambers, a series of furnaces located at each end of said kiln, a series of flues communicating with each of said furnaces and extending beneath said chambers, and air-pipes extending through said flues and having upright extensions communicating with said chambers.

In testimony whereof I have hereunto set my hand in presence of two subscribing witnesses.

ABRAHAM B. KLAY.

Witnesses:
C. F. STOLZENBACH,
HENRY W. NEFF.